United States Patent [19]
Leymann et al.

[11] Patent Number: 6,009,405
[45] Date of Patent: Dec. 28, 1999

[54] ENSURING ATOMICITY FOR A COLLECTION OF TRANSACTIONAL WORK ITEMS IN A WORKFLOW MANAGEMENT SYSTEM

[75] Inventors: Frank Leymann, Aidlingen; Dieter Roller, Schönaich, both of Germany

[73] Assignee: International Business Machines Corporation, Armonk, N.Y.

[21] Appl. No.: 08/902,390

[22] Filed: Jul. 29, 1997

[30] Foreign Application Priority Data

Aug. 1, 1996 [EP] European Pat. Off. .............. 96112430

[51] Int. Cl.$^6$ .................................................... G06F 17/60
[52] U.S. Cl. ........................... 705/9; 705/1; 705/7; 705/8
[58] Field of Search .................................. 705/1, 7, 8, 9; 364/468.05, 468.06, 468.01; 706/45

[56] References Cited

U.S. PATENT DOCUMENTS

| | | | |
|---|---|---|---|
| 4,803,039 | 2/1989 | Impink, Jr. et al. ..................... | 376/216 |
| 4,815,014 | 3/1989 | Lipner et al. ............................. | 702/184 |
| 4,858,147 | 8/1989 | Conwell .................................... | 706/19 |
| 5,301,320 | 4/1994 | McAtee et al. ............................. | 705/9 |
| 5,557,515 | 9/1996 | Abbruzzese et al. ........................ | 705/9 |
| 5,617,510 | 4/1997 | Keyroutz et al. .......................... | 706/45 |
| 5,826,239 | 10/1998 | Du et al. ..................................... | 705/8 |

FOREIGN PATENT DOCUMENTS

| | | | |
|---|---|---|---|
| 9503345 | 8/1995 | European Pat. Off. . | |
| 0694838A | 3/1996 | European Pat. Off. .......... | G06F 9/46 |
| 2263988A | 8/1993 | United Kingdom ............ | G06F 15/20 |
| 94/18620 | 8/1994 | WIPO ............................... | G06F 7/06 |

OTHER PUBLICATIONS

Gray, Jim et al., "Transaction Processing: Concepts and Techniques," Morgan Kaufmann Publishers.

"Distributed Transaction Processing: Reference Model Version 2," X-Open™.

"COBRAservices: Common Object Services Specification," Revised Edition Mar. 31, 1995.

Spohn, D.J., "Project Management Environment," IBM Tech. Discl. Bulletin, V 32, N 9A, Feb. 1990, pp. 250–254.

Marshak, Ronni T., "IBM's FlowMark Object–Oriented Workflow for Mission–Critical Applications," *Workgroup Computing Report*, V 17, N 5, pp. 3–13.

Immiss, H. A. et al., "Workflow Management Based on an Object–Oriented Paradigm," IBM Tech. Discl. Bulletin, V 37, N 3, Mar. 1994, p. 185.

Leymann, Frank et al., "Business Process Management with FlowMark," *IEEE*, pp. 230–234.

Leymann, Frank, "A Meta Model to Support Modeling and Execution of Processes," pp. 287–294.

"IBM FlowMark for OS/2 Model Efficiency Into Your Business," Second Edition Mar. 1994, 20pgs.

(List continued on next page.)

*Primary Examiner*—Allen R. MacDonald
*Assistant Examiner*—Romain Jeanty
*Attorney, Agent, or Firm*—Lacasse & Associates; Randy W. Lacasse; Ray Strimaitis

[57] ABSTRACT

A computerized transaction execution with a workflow management systems (WFMS) executes a process model consisting of a network of potentially distributed activities including transactional work items. A computerized methodology defines, controls and processes a collection of a transactional work items ensuring the atomicity of the collection of transactional work items. The collection of transactional work items owns a separate commit scope not influenced by a commit scope potentially implemented within said transactional work items. The WFMS is enabled to infer details of the process model of collections of transactional work items which can be processed in the sense of global transactions with a common commit scope. Transactional work items with a common commit scope are combined into atomic spheres. The collection of transactional work items constitute a common atomic sphere in an alternative embodiment.

18 Claims, 8 Drawing Sheets

OTHER PUBLICATIONS

Leymann, Frank et al., "Managing Business Processes as an Information Resource," *IBM Systems Journal,* V 33, N 2, 1994, pp. 326–348.

Hollingsworth, David, "The Workflow Management Coalition Specification."

"The Common Object Request Broker: Architecture and-Specification," Revision 2.0, Jul. 1995.

FIG. 1

```
1 BEGIN_WORK( );
2   <any sequence to calls to Resource Managers>
3   <any other activity within the Commit-Scope>
4 if (success)
5   COMMIT_WORK( );
6 else
7   ROLLBACK_WORK( );
```

```
1 /*------------------------------------------*/
2 /* Input:                                   */
3 /* =====                                    */
4 /* - S is an atomic sphere                  */
5 /*                                          */
6 /* Precondition:                            */
7 /* ============                             */
8 /* The function will be called whenever the control flow enters S; */
9 /* before this, the data member S.RootID of sphere S will contain the */
10/* default value NULL.                      */
11/*------------------------------------------*/
12 AtomicSphere::getRoot()
13 {
14 Transaction root;
15 if( this.enteredFirst() )            /* Is S entered first time? */
16 {
17    root = TransactionManager.createXact();/* Create new transaction */
18    this.RootID = root                 /* Set the data member */
19 };
20                                       /* ...otherwise the data */
21                                       /* member is already set! */
22 return this.RootID;
23 }
```

FIG. 6

```
1 /* ---------------------------------------------------------- */
2 /* Input:                                                     */
3 /* ======                                                     */
4 /* - S is an atomic sphere                                    */
5 /* - A is an activity implementation that has terminated so that */
6 /*   navigation will take place for it                        */
7 /* ---------------------------------------------------------- */

8  AtomicSphereActivity::Navigation( AtomicSphere S,
9                                    ActivityImpl  A )
10 {
11 Transaction root = S.getRoot();            /* Xact associated with sphere */
12 set_of(ControlConnector) obst(S),          /* obstructions to commit      */
13                          NextPaths,        /* leaving control connectors  */
14                                            /* with 'true' transition cond */
15                                            /* or virtual edge for sink    */
16                          heldIn(S);        /* deferred edges to follow    */
17 heldIn(S) = S.getWaiting()                 /* get current waiting edges   */
18 NextPaths = A.navigate();                  /* get 'true' control connects */
19                                            /* or return "virtual" edge    */
20                                            /* for sinks                   */
21 do_until( NextPaths.empty() )
22 {
23 ActivityImpl B;
24 ControlConnector E;
25 E = NextPaths.pick();                      /* pick retrieves and removes  */
26 obst(S) = S.getActualObstructions()        /* get current obstructions    */
27 if ( obst(S).memberof(E) )                 /* is E an obstruction?        */
28   {
29     obst(S).remove(E);                     /* remove obstruction edge     */
30     heldIn(S).put(E);                      /* hold navigation along E     */
31   }
32 else
33   {
34     B = EndPoint(E);                       /* get target node of E        */
35     B.dispatch();                          /* dispatch B for further      */
36                                            /* processing, i.e. evaluate   */
37                                            /* start cond., staff resolut. */
38   };
39 if( obst(S).empty() )                      /* last obstruction removed?   */
40   {
41     root.commit();                         /* commit root transaction     */
42     waitIn(S).release();                   /* release held connectors     */
43   };
44 return;
45 }
46 }
```

FIG. 8

ENSURING ATOMICITY FOR A COLLECTION OF TRANSACTIONAL WORK ITEMS IN A WORKFLOW MANAGEMENT SYSTEM

BACKGROUND OF THE INVENTION

1. Field of Invention

The present invention relates to the field of process management of a workflow environment on computer systems and the field of computerized transaction processing. More particularly, the invention relates to the area of computerized transaction execution with a workflow management systems (WFMS).

2. Definitions

The following definitions of acronyms used throughout the specification may be useful in providing a better understanding of the subject matter of the present invention:

2PC: Two-Phase-Commit Protocol
ACP: Atomic Commit Protocol
DTS: Distributed Transaction Services
ISO: International Standard Organization
ODA: Object Definition Alliance
OMG: Object Management Group
OTS: Object Transaction Services
TM: Transaction Manager
TP: Transaction Processing
WfMC: Workflow Management Coalition
WFMS: Workflow Management System
XID: Transaction Identification A transactional work item, or transaction in general, are not to be construed to be limited to a local or distributed transaction. Accordingly, a transaction may be of any of these types. Moreover, when referring generally to a transaction, the textual context will define if a general concept is meant or if a transactional work item as a specific embodiment of a transaction is denoted.

While concentrating on transactional work items being activities within a process model, any number of additional (non-transactional) activities can be part of a process model which will not be referenced explicitly.

Transactional application, hereafter transaction, comprises a sequence of operations that change recoverable resources and data, such as a database, from one consistent state into another. A transaction processing system guarantees that if a transaction executes some updates against recoverable resources and data, and if a failure occurs before the transaction reaches its normal termination or an interim point of consistency, then those updates will be undone (rollback). When a new point of consistency has been reached and all updates made by the transaction must be made permanent, the transaction commits.

To fulfill this transaction recovery guarantee, the system must be able to remember across system outages both transactions in progress and their update actions, so that their effect on recoverable data can be properly reflected when the system is restarted. In general, the system maintains a log, recorded and maintained by a log manager, of each transaction's progress and changes to the resources and data in order to fulfill the transaction recovery guarantee. The log data, known as log records, can be examined to ensure that either the transaction's committed actions are reflected in the database or were undone. When the log records include actual data, they can also be used to reconstruct data which has been damaged or lost, such as by the failure of a storage device. The log can be thought of as an ever growing sequential file.

The log is permanently stored on stable storage, such as a disk file, which remains intact and available across system failures. Log records are first written to temporary, volatile log file buffers in the computer's memory, and then transferred to stable storage at certain times (e.g., when a transaction is committed).

Locking, supported by a lock manager, is used to control simultaneously executing (i.e. concurrent) transactions' access to shared resources and shared data, and in particular is used to prevent concurrent transactions from inconsistently modifying the same resources and data. Appropriate use of locking can guarantee a transaction that the resource it manipulates and the data it reads is in a consistent state and that the resource and data does not contain uncommitted updates of other transactions.

The recoverable resources and data the transaction is manipulating further may be supported by a resource manager. A resource manager is a subsystem that manages transactional objects of a certain type. The resource manager typically offers services to applications or other resource managers, which might be available in the overall system. Many transaction based elements can act as resource managers, for example a transactional database system, a transaction queue manager, a transactional session manager.

A transaction manager administrates, manages and coordinates the flow of the multitude of concurrently processing transactions through the computer system. It orchestrates the commit and undo, i.e. rollback, of transactions, as well as the recovery of objects, resource managers or sites after they fail.

The above mentioned consistency requirement for a certain transaction and for all other concurrently processing transaction in the local or distributed transaction system is expressed as the ACID requirement. Actually ACIDicity is a combination of four different sub-requirements:

Atomicity

A transactions' changes to the state of the overall system are atomic; either all happen or none happen. These changes include all changes to resources including database changes, messages, actions on transducers and so forth.

Consistency

A transaction is a correct transformation of the system state. The actions taken as a group do not violate any of the integrity constraints associated with the state. This requires that the transaction be a correct program.

Isolation

Even though transactions execute concurrently, it appears to each transaction T, that other transactions execute either before T or after T, but not both. Therefore intermediate states of one transaction are not visible to the other transactions.

Durability

Once a transaction completes successfully and it commits its activities, its changes to the state survive failures, i.e. the state changes became permanent.

DISCUSSION OF PRIOR ART

Within computer science mechanisms are known to ensure atomicity of global transactions. Details can be found in "J. Gray, A. Reuter, Transaction Processing: Concepts and Techniques, Morgan Kaufmann Publishers, San Francisco (Calif. )" for instance. The focus is in so-called Atomic Commit Protocols (ACP) which are synchronous protocols allowing collections of transactions to reach a common consistent transactional outcome, i.e. a consistent system state (i.e. either commit or abort). The most wide-spread exploited ACP is the so-called Two-Phase-Commit (2PC)

protocol, which has been implemented and used many times in a large number of different commercial systems.

Due to its importance, the 2PC has been standardized by industry consortia: For instance, the procedural variant has been standardized by X/OPEN; its details can be found in "X/OPEN Guide, Distributed Transaction Processing Reference Model (Version 2), X/OPEN Company Ltd., U.K. 1993". The object-oriented variant has been standardized by the Object-Management-Group (OMG); its details can be found in "Object Management Group, Object Transaction Services (OTS), OMG Document TC 94.8.4 (1994)". Many standard compliant implementations of the corresponding X/OPEN standard exist.

The expressive power of a "classic" transaction, consisting only of a single atomic activity, is quite limited. Many situations exist in which a more flexible means of control would be required than a classical transaction provides. Real-world collections of transactions, called a global transaction, have to cooperate to achieve a desired processing goal. For such complex transactions, various models have been developed (i.e., savepoint techniques, nested transactions, chained transactions, etc.). An overview of different models can be found in "J. Gray, A. Reuter, Transaction Processing: Concepts and Techniques, Morgan Kaufmann Publishers, San Francisco (Calif. )".

A completely different area of technology not related to TP systems is the domain of Workflow Management Systems (WFMS). The process of designing, developing and manufacturing a new product and the process of changing or adapting an existing product presents many challenges to product managers and engineers to bring the product to market for the least cost and within schedule while maintaining or even increasing product quality. Many companies are realizing that the conventional product design process is not satisfactory to meet these needs. They require early involvement of manufacturing engineering, cost engineering, logistic planning, procurement, manufacturing, service and support with the design effort. Furthermore, they require planning and control of product data through design, release and manufacturing.

The correct and efficient execution of business processes within a company, e.g., development or production processes, is of enormous importance for a company and has significant influence on company's overall success in the market place. Therefore, those processes have to be regarded similar as technology processes and have to be tested, optimized and monitored. The management of such processes is usually performed and supported by a computer based process or workflow management system.

In D. J. Spoon: "Project Management Environment", IBM Technical Disclosure Bulletin, Vol. 32, No. 9A, February 1990, pages 250 to 254, a process management environment is described including an operating environment, data elements, and application functions and processes.

In R. T. Marshak: "IBM's FlowMark™, Object-Oriented Workflow for Mission-Critical Applications", Workgroup Computing Report (U.S.A.), Vol. 17, No. 5, 1994, page 3 to 13, the object character of IBM FlowMark™ as a client/server product built on a true object model that is targeted for mission-critical production process application development and deployment is described.

In H. A. Inniss and J. H. Sheridan: "Workflow Management Based on an Object-Oriented Paradigm", IBM Technical Disclosure Bulletin, Vol. 37, No. 3, March 1994, page 185, other aspects of object-oriented modeling on customization and changes are described.

In F. Leymann and D. Roller: "Business Process Management with FlowMark™", Digest of papers, Cat. No. 94CH3414-0, Spring COMPCON 94, 1994, pages 230 to 234, the state-of-the-art computer process management tool IBM FlowMark™ is described. The meta model of IBM FlowMark™ is presented, as well as the implementation of IBM FlowMark™. The possibilities of IBM FlowMark™ for modeling of business processes, as well as their execution are discussed. The product IBM FlowMark™ is available for different computer platforms (copies of documentation available through IBM branches.)

In F. Leymann: "A meta model to support the modeling and execution of processes", Proceedings of the 11th European Meeting on Cybernetics and System Research EMCR92, Vienna, Austria, Apr. 21 to 24, 1992, World Scientific 1992, pages 287 to 294, a meta model for controlling business processes is presented and discussed in detail.

The "IBM FlowMark™ for OS/2", document number GH 19-8215-01, IBM Corporation, 1994, copies available through IBM branches, represents a typical modern, sophisticated and powerful workflow management system. It supports the modeling of business processes as a network of activities. This network of activities, the process model, is constructed as a directed, acyclic, weighted, colored graph. The nodes of the graph represent the activities which are performed. The edges of the graph, the control connectors, describe the potential sequence of execution of the activities. Definition of the process graph is via the IBM FlowMark™ Definition Language (FDL) or the built-in graphical editor. The runtime component of the workflow manager interprets the process graph and distributes the execution of activities to the right person at the right place, e.g., by assigning tasks to a work list according to the respective person, wherein said work list is stored as digital data within said workflow or process management computer system.

In F. Leymann and W. Altenhuber: "Managing business processes as an information resource", IBM Systems Journal, Vol. 32(2), 1994, the mathematical theory underlying the IBM FlowMark™ product is described.

In D. Roller: "Verifikation von Workflows in IBM FlowMark™", and in J. Becker und G. Vossen (Hrsg.): "Geschaeftsprozessmodellierung und Workflows", International Thompson Publishing, 1995, the requirement and possibility of the verification of workflows is described. Furthermore, the feature of graphical animation for verification of the process logic is presented as it is implemented within the IBM FlowMark™ product.

For implementing a computer-based process management system, firstly the business processes have to be analyzed and, as the result of this analysis, a process model has to be constructed as a network of activities corresponding to the business process. In the IBM FlowMark™ product, the process models are not transformed into an executable. At run time, an instance of the process is created from the process model, called a process instance. This process instance is then interpreted dynamically by the IBM FlowMark™ product.

Until now, transaction processing systems and workflow management systems have been separate technological areas. An activity can be implemented as part of a process model of a workflow as a transaction, but no further intimate relationship exists. For example, the state of the art is lacking a flexible global transaction approach integrated into a WFMS.

Further difficulties are encountered when existing software components should be used for implementing activities in a WFMS and if at the same commit scope and transaction boundaries are to be established which were not already explicitly programmed into the components.

Current and future standardization of interfaces and protocols will enable manufacturers to build components that can be invoked by all WFMSs in compliance with these standards (e.g. "invoked applications" of the Workflow Management Coalition WFMC (for details refer to "Workflow Management Coalition, The workflow reference model", Document Number TC00-1003, 1994), "business objects" as common facilities of the Object Management Group OMG (for details refer to "Object Management Group, The Common Object Request Broker: Architecture and Specification", OMG, Framingham, Mass., 1992), or "business objects" defined by the Object Definition Alliance ODA). The goal is to create an industry for prefabricated components which can be bought off-the-shelf to compose implementations of applications based on models for business processes. Such components will then be reusable across different WFMSs and across business processes. In order to maximize the reusability of these components, no assumptions should be made about its usage with respect to transaction boundaries as an individual activity cannot foresee the commit scope within which it will be later used.

The current state of the art creates the problem that manufacturers of components are not able to implement their components in such a way that they can comply with externally established transaction boundaries, i.e. allow their users to overwrite the end-of-transaction decisions made by the manufacturer's implementation. This significantly limits the scope of applicability of these components. These components cannot easily compose applications which have certain transactional properties which otherwise must be programmed into the components of the application.

Whatever the precise merits, features and advantages of the above cited references, none of them achieve or fulfills the purposes of the present invention. Accordingly, it is an object of the present invention to provide for the ability to control and process a collection of a multitude of potentially distributed transactions ensuring transactional behavior for this collection, i.e., ensuring its atomicity.

It is another object of the present invention to provide a computerized methodology for defining, controlling and processing a collection of a multitude of potentially distributed transactional work items ensuring the atomicity of the collection of transactional work item while the transactional work items being part of a process model of the workflow environment and the commit scope of said collection is not necessarily implemented within said transactional work items. These and other objects are achieved by the detailed description that follows.

SUMMARY OF THE INVENTION

The present invention ensures atomic execution of a collection of transactional work items processed by at least one computer system, said computer system storing a process-model, said process-model comprising one or more activities being the nodes of an arbitrary graph and directed edges of said graph being control-connectors defining a potential flow of control within said process-model. The fundamental approach of this invention consists in exploiting the global information already available within the process model to identify and define those transactional work items constituting a collection of transactional work items with a common commit scope and thus representing a global transaction. Such a collection is called an atomic sphere. For the purpose to define such atomic spheres, the process model is analyzed to identify sub-graphs having the property that such a sub-graph does not contain not necessarily different activities which are connected by a path of control-connectors which contains at least one activity not contained in said atomic-sphere. Therefore, the structural information on commit scopes is no longer situated within a TP system or within the transactional application.

The technique proposed by the present invention uses the global information already available in the process model to define atomic spheres. The definitions on commit scopes and transaction boundaries are associated on the level of process models and not within the implementation of a transactional application. Thus, opening the door for an industry of prefabricated components which can be bought off-the-shelf to compose implementations of applications based on models for business processes. Such components will then be reusable across different processing environments and across different business processes. The current teaching maximizes the reusability of these components because no assumptions have to be made about a component's usage, with respect to transaction boundaries, as an individual activity cannot foresee the commit scope within which it will be later used. This invention enables manufacturers of WFMSs to:

1. let their customers specify groupings of activities which will have the property that either all activities of the grouping have performed transactionally successful (i.e. its changes on recoverable objects have been committed or were identified to be omitted from transaction completion based on the actual workflow) or all have been aborted; and
2. manage such groupings at run time in such a way that the above operational behavior is enforced.

This invention further enables manufactures of components to implement their components in such a way that they can comply with externally established transaction boundaries, i.e. allow their users to overwrite the end-of-transaction decisions made by the manufacturer's implementation. This will broaden the scope of applicability of these components. This invention further enables users' WFMSs to easily use components to compose applications which have certain transactional properties which otherwise must be programmed into the components of the application. Moreover, the invention reduces the conceptual and technical gap existing between TP systems and WFMS.

A computerized method of defining at least one atomic-sphere is extended to determine sink-activities of said atomic-sphere with no outgoing control-connector and, if at least one sink-activity is determined, adding a no-op-activity to said process-model being outside of said atomic-sphere and connecting said sink-activity to that no-op-activity with a virtual-control-connector, said no-op-activity implementing a dummy activity.

Due to these extensions of the process model, the process to execute and control atomic execution of an atomic sphere, based on the method to define an atomic sphere, becomes much more efficient.

The current teaching suggests to add a TRUE-transition-condition always being true to said virtual-connectors. This again increases efficiency as no processing intensive verification is required whether the corresponding no-op-activity may be started or not.

According to the teaching of this invention, the computerized method of defining an atomic-sphere is to be executed by separate control-instance which can, for example, be a workflow management system or a transaction processing system.

A WFMS is an ideal candidate for executing the suggested method as the whole process model information is available to this control instance. Existing TP systems can be extended to execute the methodology of the present invention. It is also possible to merge WFMS and TP systems to a new type of TP system also defining atomic spheres.

The present invention teaches to atomically execute an atomic-sphere using at least one computer system by creating an atomic-sphere-transaction-context for said atomic-sphere. The control-flow along said control-connectors enters said atomic-sphere the first time, and ensuring that the control-flow will not leave said atomic-sphere until the complete control-flow reaches the boundary of said atomic-sphere by postponing navigation along control-connectors leaving said atomic-sphere until all leaving control-connectors are processed.

This methodology complements the method of defining an atomic sphere and thus also supports the advantages referred to above. Moreover, it should be pointed out that the approach to introduce a method separate from the transactional work items to control the commit scopes significantly reduces the implementation effort and the processing efficiency of transactional work items. Transactional work items are no longer forced to control a potential commit scope in which they are operating.

The present invention teaches to end said atomic-sphere-transaction-context, when the complete control-flow reaches said boundary of said atomic-sphere by committing all transactional-work items processed as part of said atomic-sphere.

Besides the fact that this behavior ensures the atomicity of the global transaction, it may reduce at the same time the number of commits and the effort of commit handling as committing an atomic sphere may be done only once.

Atomically executing an atomic-sphere takes place by using an existing atomic-sphere-transaction-context, if the control-flow enters an atomic-sphere for which an atomic-sphere-transaction-context has been established already because the control-flow entered said atomic-sphere before.

This feature supports to process the activities within a process model in a parallel fashion. Each activity may be processed in parallel and independent from other activities automatically and as soon as a transactional work item is started it is determined if a transaction context does already exist. If so, the transactional work item automatically joins the atomic sphere it belongs to.

According to this teaching, a transactional-work item is either never committing said ending said atomic-sphere-transaction-context or a transactional-work item is committing only, if no atomic-sphere-transaction-context has been established yet.

The above feature supports the possibility that a certain transactional work item may be implemented based on a private commit scope, but as soon it is processed as part of an atomic sphere it joins the transaction context of the encompassing atomic sphere. Again, such a property is a significant advantage in terms of the above mentioned prefabricated component industry.

The present invention teaches several possibilities to determine a potential existence of an atomic-sphere-transaction-context. This determination can be achieved by a query-transaction-service (GetRoot), or by passing a potential existing atomic-sphere-transaction-context to an activity when invoking said activity, or by passing a transaction-identifier to an activity when invoking said activity, or by passing said atomic-sphere-transaction-context to an activity as part of an input-container.

This large number of different alternatives supports significant amount of flexibility allowing to operate this method in almost any type of environment.

This part of the invention teaches a performance-effective approach to ensure that the control-flow will not leave an atomic-sphere (S) until the complete control-flow reaches the boundary of said atomic-sphere. For this purpose, the invention suggests to administrate a set of actual-obstructions (OBST(S)) comprising the set of all control-connectors originating from activities within said atomic-sphere directed to target-activities outside said atomic-sphere and which control-connectors have not been reached so far by the current process instance, and by further delaying execution of said target-activities until all obstructions of said set of actual-obstructions have been reached.

The above feature exploits information already available to the control instance supervising the execution of a process model, thus preventing to setup a lot of extra control information to manage atomic spheres.

BRIEF DESCRIPTION OF THE DRAWINGS

FIG. 1 is a diagram reflecting the overall structure of a transaction program in pseudo-code.

FIG. 6 is a diagram reflecting the major elements to determine a potential existing transactional context.

FIG. 8 is a diagram reflecting details of administrating the set of actual obstructions.

DESCRIPTION OF THE PREFERRED EMBODIMENTS

The present invention is illustrated based on IBM's Flow-Mark™ workflow management system, but should not be limited thereto. Other WFMS could be substituted therefore. Furthermore, the current teaching applies also to any other type of system which offers WFMS functionalities not as a separate WFMS but encapsulated within another type system. For example WFMS functionalities could be integrated to TP systems.

1.0 Introduction 1.1 Transaction Processing

As previously outlined, a transaction, also called a transactional application, comprises a sequence of operations that change recoverable resources and data, such as a database from one consistent state into another. A transaction processing system guarantees that if a transaction executes some updates against recoverable resources and data, and if a failure occurs before the transaction reaches its normal termination or an interim point of consistency, then those updates will be undone (rollback). When a new point of consistency has been reached and all updates made by the transaction must be made permanent, the transaction is committed.

FIG. 1 gives a short outline on the overall structure of a transaction program in a pseudo-code representation. A transaction application program can be written in any conventional or specialized programming language known in the art. The transaction application program declares the start of a new transaction by invoking BEGIN_WORK( ) in line 1. Thereafter, all operations performed by the program will be part of this transaction. Also, all operations performed by other programs in service of the transaction application program (within the program scope of line 2–3) will be part of the transaction. The program declares the transaction to be a complete and correction transformation of the system state by invoking COMMIT_WORK( ) in line 5 of FIG. 1. Once the transaction successfully commits, the transaction's effects are durable and persistent. If something goes wrong in the transaction, the transaction application can undo all the operations by invoking ROLLBACK_WORK( ) in line 7. If there is a failure during the transaction's execution, the system can unilaterally cause the transaction to be rolled back. BEGIN-COMMIT or BEGIN-ROLLBACK, then, are used to bracket the ACID transformations.

Figure 2:
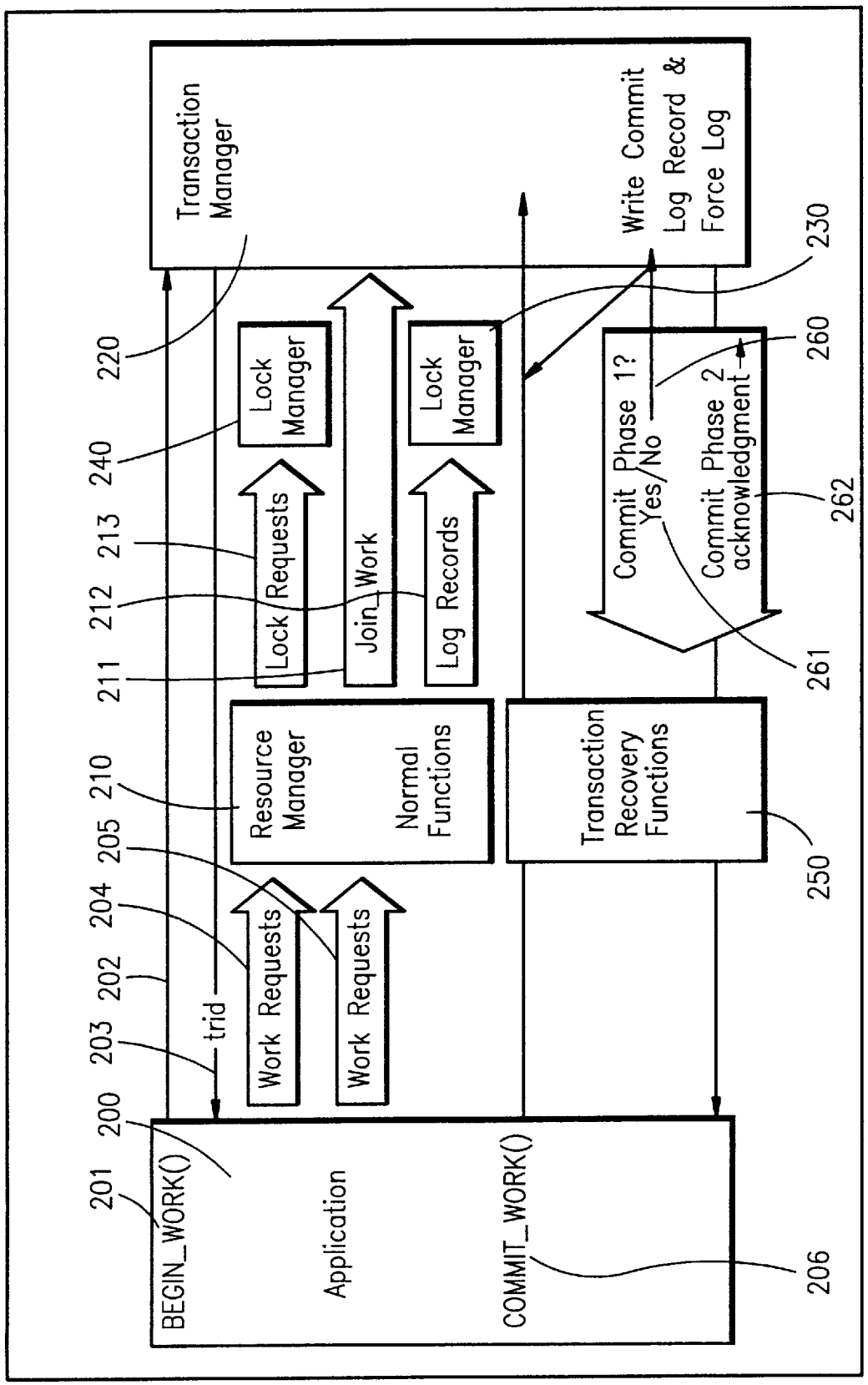
FIG. 2 visualizes the basic control flow of a transactional application and the major components within a transaction processing system.

The basis control flow of a transactional application and the major components within a transaction processing system are visualized in FIG. 2. FIG. 2 depicts

- the transaction program 200,
- one of a potential multitude of resource managers 210, a resource manager being a subsystem that manages some transactional objects of a certain type. The resource manager typically offers services to applications or other resource managers, which might be available in the overall system.
- the transaction manager 220, which orchestrates the commit and rollback of transactions, as well as the recovery of objects, resources, resource managers or local or remote sites after they fail,
- the log manager 230, which records a log of changes made by the transaction, so that a consistent version of all objects and resources can be reconstructed in case of failure,
- a lock manager 240, which provides a generic mechanism to regulate concurrent access to objects and resource, helping the resource managers to provide transaction isolation,
- the transaction recovery functions 250, activated in case of failures within the commit scope of the transaction program.

According to FIG. 2 the BEGIN_WORK( ) verb 201 starts the transaction, registering it 202 with the transaction manager and creating a unique transaction identifier 203. Once the application has started a transaction, it can begin to invoke resource managers 204 to 205, reading and writing databases, sending requests to local and remote sites or manipulating any other type of resource.

When resource manager 210 gets the first request associated with that transaction, it joins 211 the transaction, telling the local transaction manager 220 that it wants to participate in the transactions's commitment and rollback operations. It is typical for several resource managers to join the transaction. As these resource managers perform work on behalf of the transactions, they keep lists of changes made to objects. As a rule, they record both the old and the new value of an object or resource. The transaction processing system provides a logging service 212 to record these changes. The log manager 230 efficiently implements a sequential file of all the updates of transaction to objects and resources. Of course, the resource managers have to tell the log manager what these updates are.

To provide isolation, resource managers lock 213 the objects and resources accessed by the transaction; this prevents other transactions from seeing the uncommitted updates of this transaction and prevents them from altering the data read or written by this uncommitted transaction. The transaction processing system provides a lock manager 240 that other resource managers can use.

When the transaction 200 issues COMMIT_WORK( ) 206, the transaction manager performs an atomic commit protocol, i.e. in the current case a two-phase-commit-protocol 260. First, it queries all resource managers that joined the transaction, asking 261 if they think the transaction is a consistent and complete transformation. Any resource manager can vote no 262, in which case the commit fails. But if all the resource managers vote yes 262, then the transaction is a correct transformation, and the transaction manager records this fact in the log, informing each resource manager that the transaction is complete. At this point, the resource managers can release the locks and perform any other operations needed to complete the transaction. If the transaction should fail during execution, or if a resource manager votes no during phase 1 of the 2PC, then the transaction manager orchestrates transaction rollback. In this case, the transaction manager reads the transaction's log and, for each log record, invokes the resource manager that wrote the log record, asking the resource manager to undo the operation. Once the undo scan is complete, the transaction manager invokes each resource manager that joined the transaction and tells it that the transaction was aborted.

The transaction manager also orchestrates transaction recovery, if a node or site fails. It provides generic services for the failure of a single object, the failure of a resource manager, and the failure of an entire site.

The following describes how the transaction manager helps in system recover.

After a site fails, the transaction processing (TP) system restarts all resource managers. Several transactions may have been in progress at the time of the failure. The resource managers contact the transaction manager as part of their restart logic. At that time, the transaction manager informs them about the outcome of each transaction that was active at the time of the failure. Some may have committed, some may have aborted, and some still may be in the progress of committing. The resource manager can recover its committed state independently, or it can participate in the transaction manager's undo and redo scan of the log.

If a resource manager fails but the rest of the TP system continues operating, the transaction manager aborts all transactions involved with that resource manager. When the resource manager returns to service, the transaction manager informs the resource manager about the outcome of those transactions. The resource manager can use this information and the transaction log to reconstruct its state.

If a particular object is lost but the resource manager is otherwise operational, then the resource manager can continue to offer service on other objects while the failed object is reconstructed from an archive copy and from a log of all committed changes to that copy. The transaction manager and the log manager aid recovery from an archive copy of the object.

Each site usually has a separate transaction manager. This allows each site to operate independently of the others, providing local autonomy. When the transaction's execution is distributed among several sites, it is distributed among several transactions managers. In that case, the 2PC protocol is used within multiple transaction managers.

Resources, also called transactional objects, maintained and controlled by a resource manager are protected resources or recoverable resources. Actions targeted against protected resources do not externalize their results before they are completely done. Their updates are commitment controlled, they can rollback if anything goes wrong before a normal end, and once they have reached their normal end, there will be no unilateral rollback. Thus actions targeted at protected resources have the ACID property.

Figure 3:
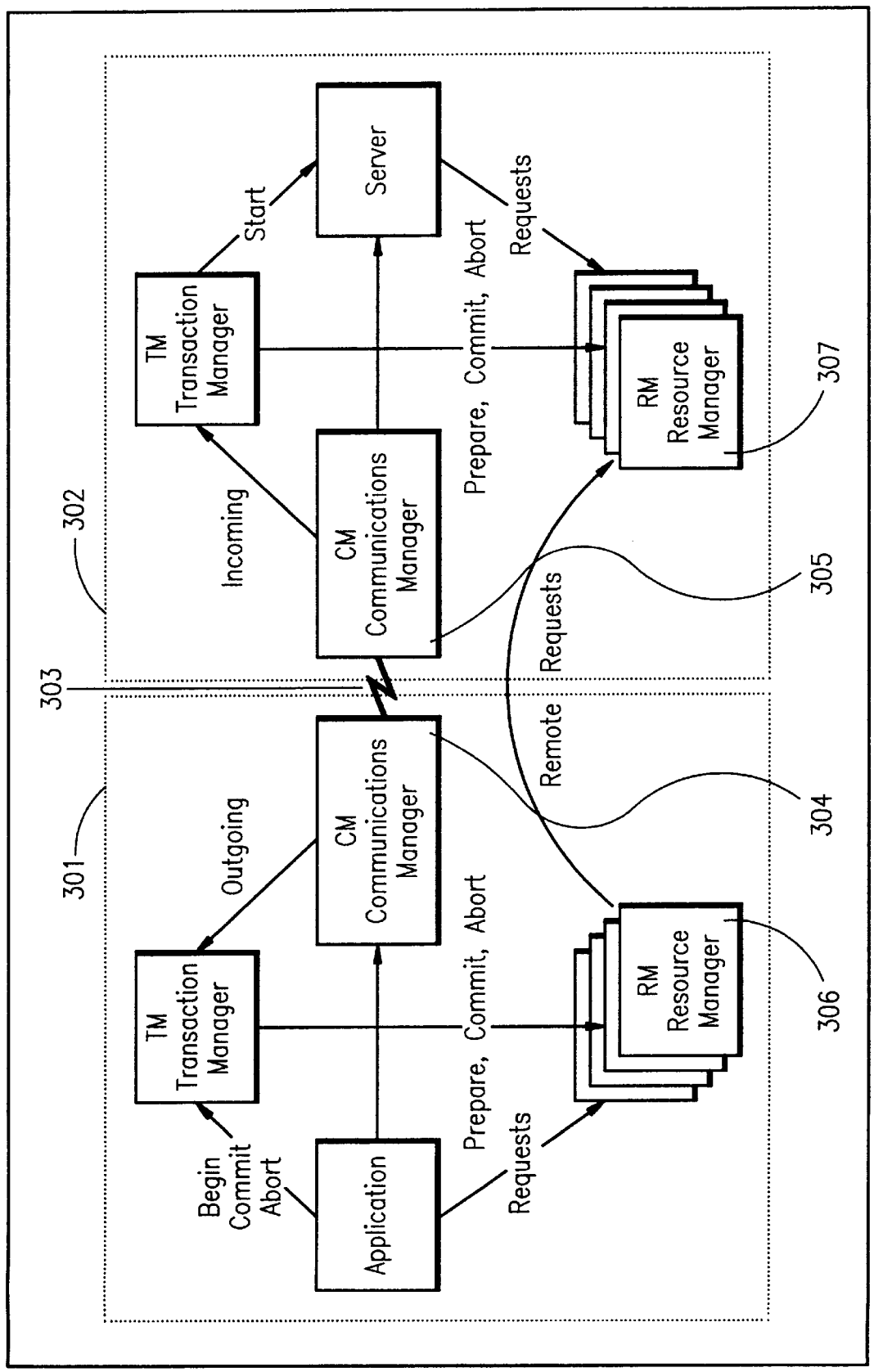
FIG. 3 is a visualization of the distributed transaction model.

FIG. 3 visualizes a TP system focusing on the aspects of distributed TP systems. Furthermore, some variants, compared to the model outlined in FIG. 2, are portrayed. The model of FIG. 3 is along the lines of the X/OPEN consortium point of view.

Two TP systems 301 and 302 are connected via a computer network 303. Both TP systems encompass a specific resource manager responsible for the communication between them, the communication managers 304 and 305. Moreover, in this model, it is assumed that each resource manager 306 and 307 has a private log and a private lock manager. It is presumed that the resource manager performs its own rollback, based on a single rollback call from the transaction manager, in case the transaction aborts.

The expressive power of a "classic" transaction just consisting of a single atomic activity is quite limited. Many situations exist in which a more flexible means of control would be required than classical transaction provides. Especially for real-world applications, collections of transactions have to cooperate to achieve a desired processing goal. Such a collection of classical ACID transactions is called a global transaction, if its atomicity is ensured. Computer science mechanisms are known to ensure atomicity of global transactions. One approach to deal with the problem of global transactions are so-called chained transactions. Chained transactions offer a particular approach to reduce to a certain extent the processing effort associated with synchronous Atomic Commit Protocols (ACP) for assuring ACIDicity. Other approaches are for example savepoint techniques, nested transactions, sagas and so on.

1.2 Workflow Management Systems

The following is a short outline on the basic concepts of a workflow management system based on IBM's Flow-Mark™ WFMS:

From an enterprise point of view, the management of business processes is becoming increasingly important: business processes control which piece of work will be performed by whom and which resources are exploited for this work, i.e. a business process describes how an enterprise will achieve its business goals. A WFMS may support both, the modeling of business processes and their execution.

Modeling of a business process as a syntactical unit in a way that is directly supported by a software system is extremely desirable. Moreover, the software system can also work as an interpreter basically getting as input such a model: The model, called a process model, can then be instantiated and the individual sequence of work steps, depending on the context of the instantiation of the model, can be determined. Such a model of a business process can be perceived as a template for a class of similar processes performed within an enterprise; it is a schema describing all possible execution variants of a particular kind of business process. An instance of such a model and its interpretation represents an individual process, i.e. a concrete, context dependent execution of a variant prescribed by the model. A WFMSs facilitates the management of business processes. It provides a means to describe models of business processes (build time) and it drives business processes based on an associated model (run time). The meta model of IBM's WFMS FlowMark™, i.e. the syntactical elements provided for describing business process models, and the meaning and interpretation of these syntactical elements, is described next.

Activities are the fundamental elements of the meta model. An activity represents a business action that is from a certain perspective a semantical entity of its own. With the model of the business process it might have a fine-structure that is then represented in turn via a model, or the details of it are not of interest at all from a business process modeling point of view. Refinement of activities via process models allows for both, modeling business processes bottom-up and top-down.

The results produced by the work represented by an activity is put into an output container, which is associated with each activity. Since an activity will, in general, require access to output containers of other activities, each activity is additionally associated with an input container. At run time, the actual values for the formal parameters building the input container of an activity represent the actual context of an instance of the activity.

Since activities might not be executed arbitrarily, they are bound together via control connectors. A control connector might be perceived as a directed edge between two activities; the activity at the connector's end point cannot start before the activity at the start point of the connector has finished (successfully). Control connectors model thus have the potential flow of control within a business process model.

In addition, a Boolean expression called transition condition is associated with each control connector. Parameters from output containers of activities having already produced their results are followed as parameters referenced in transition conditions. When an activity terminates successfully at run time, all control connectors leaving this activity are determined and the truth value of the associated transition conditions is computed based on the actual values of their parameters. Only the end points of control connectors the transition conditions of which evaluated to TRUE are considered as activities that might be executed based on the actual context of the business process. Transition conditions model thus the context dependent actual flow of control within a business process (i.e. an instance of a model).

FlowMark™ consists, at the coarsest level, of a build time component and a run time component. The build time component supports the modeling of business processes according to the meta model described above and the run time component supports the corresponding semantics. Both components are implemented in a client/server structure. The client delivers the interaction with the user via an object-oriented graphical interface, invokes local tools, and provides animation. The server maintains the database for process instances, navigates through the process graph, and assigns the activities to the proper resources.

Process definition includes modeling of activities, control connectors between the activities, input/output container, and data connectors. A process is represented as a directed acyclic graph with the activities as nodes and the control/ data connectors as the edges of the graph. The graph is manipulated via a built-in, event-driven, CUA compliant graphic editor. The data containers are specified as named data structures. These data structures, themselves, are specified via the DataStructureDefnition Facility. FlowMark™ distinguishes three main types of activities: program activities, process activities, and blocks. Program activities are implemented through programs. The programs are registered via the Program Definition Facility. Blocks contain the same constructs as processes, such as activities, control connectors etc. They are however, not named and have their own exit condition. If the exit condition is not met, the block is started again. The block thus implements a Do Until construct. Process activities are implemented as processes. These subprocesses are defined separately as regular, named processes with all its usual properties. Process activities offer great flexibility for process definition. It allows construction of a process through permanent refinement of activities into program and process activities (top-down), but also to build a process out of a set of existing processes (bottom-up). In particular, process activities help to organize the modeling work if several process modeler are working together. It allows the team members to work independently on different activities. Program and process activities can be associated with a time limit. The time limit specifies how long the activity may take. If the time is exceeded, a designated person is notified. If this person does not react within another time limit, the process administrator is notified. It not only helps to recognize critical situation but also to detect process deficiencies as all notifications are recorded in an audit trail.

All data structures used as templates for the containers of activities and processes are defined via the Data Structure Definition Facility. Data Structures are names and are defined in terms of elementary data types, such as float, integer, or string and references to existing data structures. Managing data structures as separate entities has the advantage that all interfaces of activities and their implementations are managed consistently in one place (similar to header files in programming languages).

All programs which implement program activities are defined via the Program Registration Facility. Registered for each program is the name of the program, its location, and the invocation string. The invocation string consists of the program name and the command string passed to the program.

Before process instances can be created, the process model must be translated to ensure the correctness and completeness of the process model. The translated version of the model is used as a template when a process instance is created. This allows changes to the process model without affecting executing process instances. A process instance is started either via the graphical interface of via the callable process application programming interface. When a process is started, the start activities are located, the proper people are determined, and the activities are posted onto the work list of the selected people. If a user selects the activity, the activity is executed and removed from the work list of any other user to whom the activity has been posted. After an activity has executed, its exit condition is evaluated. If not met, the activity is rescheduled for execution, otherwise all outgoing control connectors and the associated transition conditions are evaluated. A control connector is selected, if the condition evaluates to TRUE. The target activities of the selected control connectors are then evaluated. If their start conditions are true, they are posted to the work list of selected people. A process is considered terminated, if all end activities have been completed. To make sure that all end activities finish, a death path analysis is performed. It removes all edges in the process graph which can never be reached due to failing transition conditions. All information about the current state of a process is stored in the database maintained by the server. This allows for forward recovery in the case of crashes.

1.3 Overview of the Solution

The current invention describes a methodology of how a WFMS can ensure that particular collections of transactional work items are performed in an atomic manner. The WFMS thus achieves an integration of transactions by a WFMS.

Until now, transaction processing systems and workflow management systems are separate technological areas. For example the state of the art is lacking an approach of a multitude of WFMS activities representing individual potentially distributed transactions which assemble some type of global transactions with respect to an underlying TP system, for which atomicity is assured. Moreover, no approaches for defining and observing a commit scope with transaction boundaries encompassing several activities within the WFMS are available, including the possibility to model commit scopes and transactions boundaries within a WFMS, i.e. outside TP systems.

Further difficulties are encountered when existing software components should be used for implementing activities in a WFMS and if at the same time transaction boundaries are to be established not already explicitly programmed into the components or if at the same time transaction boundaries are to be established deviating from those explicitly programmed into the components.

Various activities are currently standardizing interfaces and protocols supporting the goal to create an industry for prefabricated components which can be bought off-the-shelf to compose implementations of applications based on models for business processes. Such components will then be reusable across different WFMSs and across business processes. The paradigm of component based software construction promises the large scale exploitation of the benefits of reusing prefabricated parts to build applications, even by non-data-processing professionals. These parts are plugged together via "using languages" like scripts or workflows. By focusing in what follows on workflows as the means to plug parts together, the usual nomenclature of "activity implementation" (or "activity" for short) instead of "part" can be adopted. In order to maximize the reusability of these components, no assumptions should be made about its usage with respect to transaction boundaries as an individual activity cannot foresee the commit scope within which it will be later used.

Therefore the current invention is based on the approach that the WFMS itself is responsible to establish and control the commit scope and the transaction boundaries of groups of activities within the process model, said activities are called transactional work items, if transactional behavior is to be guaranteed for their execution. The present invention includes the specification of transactional properties of groupings of external components to them as a property of the model of the business process. The invention is especially independent from any enhancements of above mentioned standards already published because they are considered to be not practical based on above mentioned obstructions.

The current state of the art creates the problem that manufacturers of components are not able to implement their components in such a way as to comply with externally established transaction boundaries, i.e. allow their users to overwrite the end-of-transaction decisions made by the manufacturer's implementation. This significantly limits the scope of applicability of these components. These components cannot easily compose applications which have certain transactional properties which otherwise must be programmed into the components of the application.

Figure 4:
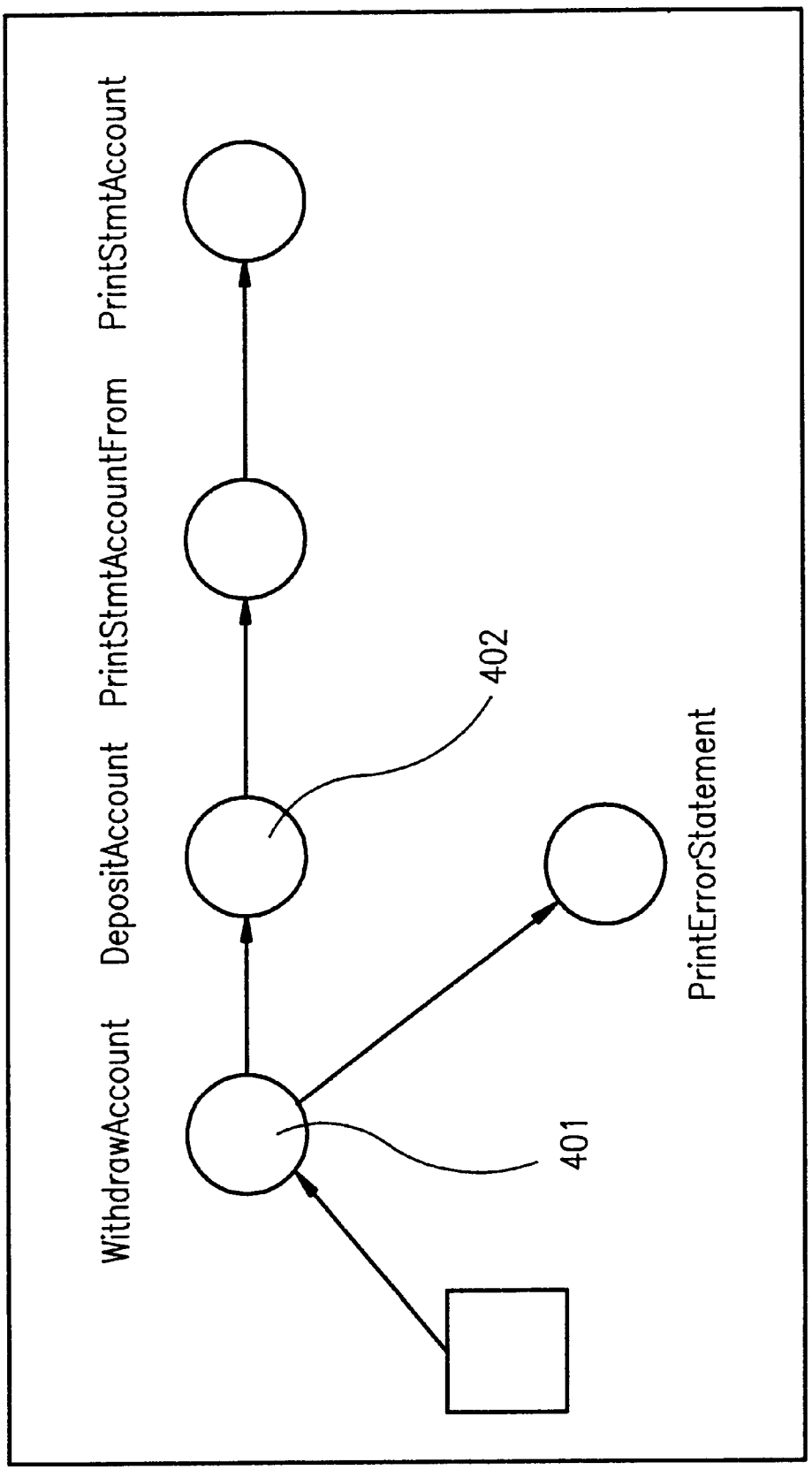
FIG. 4 is a diagram reflecting the problem of commit scopes of a single transactional work item vs. a collection of transactional work items.

In order to be reusable in a large spectrum of applications, each activity implementation must have in addition (to above mentioned requirements) the liberty to establish its own transaction boundaries. The problem occurs when an application requires the grouping of such activity implementations into a common transaction boundary, for example to avoid the loss of updates. According to FIG. 4, which reflects the problem of commit scopes of a single transactional work item versus a group of transactional work items, that a funds transfer workflow encompasses an activity WITHDRAW 401 and an activity DEPOSIT 402. The WITHDRAW activity withdraws the amount to be transferred from the account being the source of the transfer and the DEPOSIT activity deposits this amount to the account being the target of the transfer. Both activities commit their changes to their (local) database according local commit scopes relating only to the individual transactional work item. It might happen that the commit of the DEPOSIT activity is not accepted while the commit of the WITHDRAW activity is accepted. In this case, the amount has been withdrawn from the source account but it has not been deposited on the target account. As a result, no global commit scope encompassing both activities WITHDRAW and DEPOSIT could be established, the amount to be transferred is lost.

To cope with these difficulties, the current invention specifies transactional properties of groupings of such components external to them as a property of the model of the business process. This invention enables manufacturers of WFMSs:

1. to let their customers specify groupings of activities which will have the property that either all activities of the grouping have performed transactionally successful (i.e. its changes on recoverable objects have been committed or were identified to be omitted from transaction completion base on the actual workflow), or all have been aborted; and
2. to manage such groupings at run time, in such a way that the above operational behavior is enforced.

This invention enables manufactures of components (see above) to implement their components in such a way that they can comply with externally established transaction boundaries, i.e. allow their users to overwrite the end-of-transaction decisions made by the manufacturer's implementation. This will broaden the scope of applicability of these components.

This invention enables users WFMSs to easily use components to create applications which have certain transactional properties otherwise programmed into the components of the application. The major concepts of the current invention are:

1. Only transactional work items can be grouped together so that a WFMS can manage the atomic outcome of the operations of a collection of such work items. A transactional work item is a work item whose associated activity implementation is based on a recoverable resource manager and whose behavior is influenced by participating in a transaction. Of course, other non-transactional activities may participate in the underlying process model but they will not benefit from the atomicity support.
2. Only atomic spheres (a concept introduced by the invention and further outlined below) can be controlled to reach an atomic outcome. Consider the (not necessarily connected) subgraph of the graph representing the model of the overall workflow, being a specific instantiation and the executable version of a process model defined by a collection of transactional work items. This subgraph is an atomic sphere, if and only if none of its connected components is reachable from a (not necessarily different) connected component of the same graph via a path within the encompassing graph containing at least one node not belonging to the sub-graph.
3. When the control flow enters an atomic sphere the first time, the WFMS creates a transaction context for the atomic sphere. This transaction context is shared by all transactional work items contained within the atomic sphere. The WFMS ensures that the workflow will not leave the atomic sphere until the control flow within each connected component of the atomic sphere reaches the boundary of the atomic sphere. At this point in time, the WFMS ends the transaction represented by the common transaction context by issuing a global commit for all transactional work items (activities) within the atomic sphere to the underlying transaction processing system.

1.4 The Behavior of the Activity Implementation

The activity implementation of a transactional work item must not initiate an end-of-transaction (EOT) processing, when invoked within an atomic sphere. This is because it must avoid a single transactional work item commits the commit scope of a collection of transactional work items combined into an atomic sphere.

Several principle solutions are possible for this requirement. The activity implementation can achieve this either by initiating EOT-processing, or invoking this functionality only if it has verified that there is no current common transaction context (encompassing the commit scope of this specific transactional work item) established.

An activity implementation avoiding invoking EOT-processing depends on an encompassing instance like a WFMS providing atomic spheres according to this invention to commit or rollback its processing results. Activity implementations will not participate in a collection of transactional work items and atomicity is to be assured for that specific activity alone, therefore the activity implementation will be an atomic sphere of its own.

An activity implementation, being able to establish its own transaction boundaries in order to be usable outside WFMS implementing atomic spheres, can check the existence of a current transaction context according one of the following possibilities:

In an OMG Object Transaction Services (OTS) environment invocation of the get_control( ) operation could be extended to return a potential existing transaction context. If a NULL object reference is returned, there is no transaction context established and the activity implementation has to establish its own transaction boundaries; otherwise, the activity implementation is not allowed to initiate EOT-processing because this will be done by the WFMS due to an existing transactional context.

In an X/Open Distributed Transaction Processing (DTP) environment invocation of the tx_info( ) function of the transaction manager interface could be extended to return a potential existing transaction context. If the transaction identification (XID) element of the returned TXINFO structure is null, the activity implementation has to establish its own transaction boundaries because there is no transaction context established; otherwise, the activity implementation is not allowed to initiate EOT-processing because this will be done by the WFMS due to an existing transactional context.

Another possibility is that the activity, when started by the WFMS, is getting passed a transaction context or a reference to an established transaction context. Thus, depending on whether a transaction context has been passed the implementation of the activity can decide whether to establish its own transaction context or not.

1.5 The Notion of an Atomic Sphere

A workflow is an instance of a process model. We assume that process models are described as a network of activities constructed as a directed, acyclic, weighted, colored graph (in accordance with the view of responsible standardization body WfMC), so a workflow may be perceived as a particular collection of paths taken in such a graph. Of course, the execution of the various potential paths may or may not depend on further conditions, for example on transition conditions.

The activities to be performed within a process are the nodes of the associated graph. A work item within a workflow is always associated within a particular activity of the corresponding graph. Consequently, the grouping of work items w.r.t. transactional behavior is performed by specifying a collection of activities of a process model. In that sense, a set of activities of a process model is called an atomic sphere, if and only if the subgraph defined by this set does not contain two (not necessarily different) nodes which are connected via a path in the encompassing graph which contains at least one node not contained in the atomic sphere.

It is important to recognize that the WFMS is able based on a process model to automatically determine atomic spheres. Moreover, it is possible for instance that, based on certain criteria a user might define (for instance a specific node belonging or not belonging to a certain atomic sphere) that the WFMS is able based on a process model to automatically determine atomic spheres.

The transactional semantics of an atomic sphere is as follows: When the control enters the atomic sphere the first time, the WFMS establishes the common transaction context for all work items corresponding to activities within the sphere. The WFMS will postpone navigation along all edges leaving the atomic sphere, until all these edges are ready for further processing. At this point in time, the WFMS issues a global commit, i.e. the transactional work items encompassed in the atomic sphere are initiated to progress with their EOT-processing.

Figure 5:
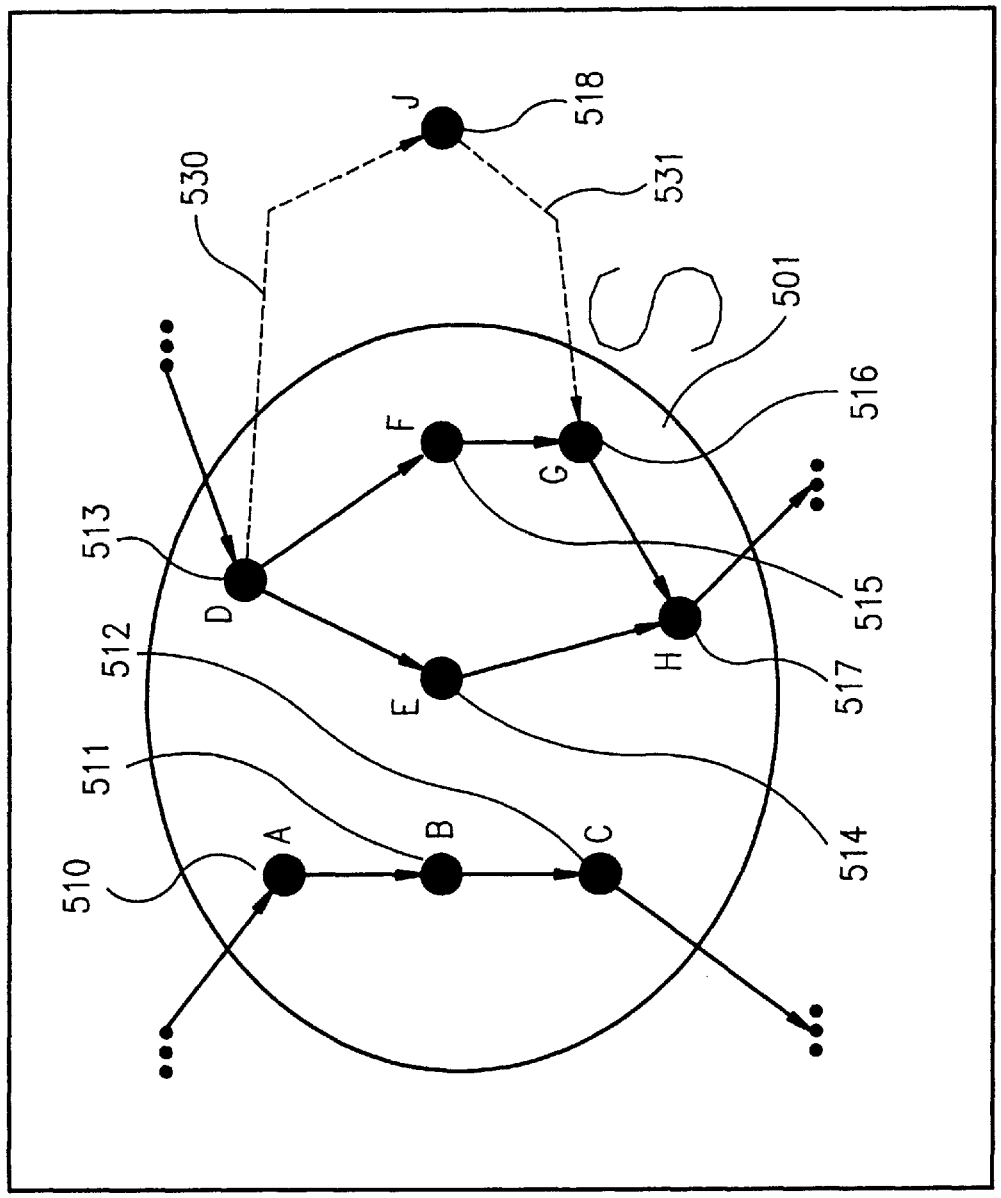
FIG. 5 depicts an example of the notion of an atomic sphere together with an extension avoiding deadlock situations.

The fundamental restriction on a collection of activities to define an atomic sphere is that paths which are leaving a sphere must not enter it again. This is to avoid deadlock situations. FIG. 5 depicts an example of the notion of an atomic sphere. For example, FIG. 5 depicts an atomic sphere S 501 consisting of the activities A 510 to H 517, satisfying above defined criteria. In case the activity, J 518 is added to the process model with the two dashed control connectors 530 and 531 the collection S={A, . . . ,M} will no longer be an atomic sphere because D 513 and G 516 are connected via a path {531, 531} that encompasses a node (namely J 518) outside of S. Thus, the WFMS would wait with navigating from D 513 to J 518 until the control flow is ready to leave the sphere from both, C 512 and H 517. But since G 516 will never be started by the WFMS because it is waiting for the termination of J 518, H 517 will never be started showing the dead-lock condition.

1.6 Determining the Common Transaction Context

Let S be an atomic sphere in the process P. All work items (which are transactional by definition of an atomic sphere) performed within an atomic sphere are executed within a common transaction context. When control flow is entering a sphere the WFMS must make sure that a common transaction context (called the root) which is representing S is established. If the root has already been established because the control flow entered the sphere previously, the transaction identifier of this root was returned; otherwise, the root is created and the associated transaction identifier is returned.

When the implementation of a (transactional) work item A within an atomic sphere S is invoked, it must get passed (for instance by certain parameters) the transaction identifier RootID of the root transaction representing S. This allows A to determine the already established transaction context. Another possibility is that the transactional work item A is calling a specific service, getRoot( ) in our embodiment, determining and returning a potential existing transactional context. As shown in FIG. 6, which reflects the major elements of a C++ program for the getRoot( ) service, this determination can be done without involving the WFMS for this purpose. The basic logic behind getRoot( ), as reflected in FIG. 6, is to create a new transaction context in line 17 if no transaction contest has been created so far, and to return the transaction context in line 22 if one does exist.

In this case or in similar cases, when relying on comparable services according to the environment, specific operations of X/Open DTP or OMG DTS, respectively, the activity implementation is dependent on a certain type of transaction processing environment. To avoid this, the current invention proposes that the WFMS supports the identifier of the common transaction context as a build-in data member "RootID" of each input container, but should not be limited thereto. Other mechanisms, like an API for "invoked applications" allowing to enquire the root (for example the above "getRoot( )") are envisioned.

1.7 The Notion of Obstructions

Let S be an atomic sphere in the process P. If S contains an activity with no outgoing control connector (called a sink) we add a virtual node (e.g. an activity having a NOP implementation performing no actual activity other than just returning) to P but outside of S, and connect all sinks of S with this particular "virtual node" via a control connector, then called virtual connector, having a TRUE transition condition. The set of formal obstructions fobst(S) of S is defined as the set of all edges originating from an activity within S having a target activity outside of S. The formal obstruction set of an atomic sphere represent the transitions of all different paths of the potential flow of control from within the sphere to outside the sphere.

Figure 7:
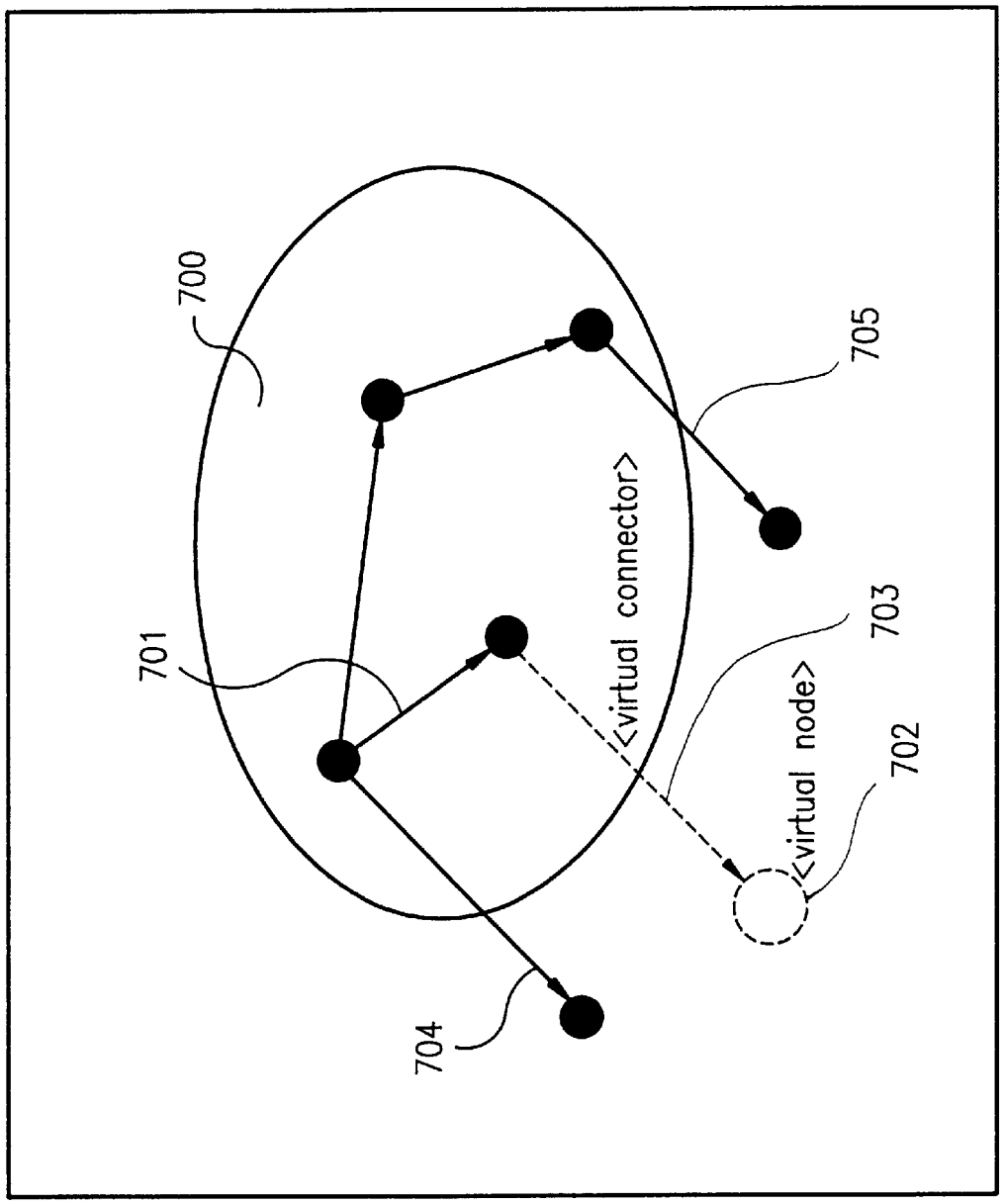
FIG. 7 is a diagram reflecting the set of formal obstructions fobst(S) of a certain atomic sphere S and the notion of virtual nodes and virtual connectors.

The above mentioned teachings are reflected in FIG. 7. FIG. 7 shows an atomic sphere S 700 with certain activities and certain control connectors. The activity 701 is sink according to the above terminology, as there is no outgoing control connector associated with that activity. By adding a virtual node 702 and a virtual connector 703, activity 701 loses the property of representing a sink. Finally, after the modifications of the process model, the atomic sphere S 700 has a set of formal obstructions consisting of the control connectors of obst(s) ={703, 704, 705}.

The set of actual obstructions (hereafter obstructions) obst(S) of S is the set of all formal obstructions which have not been touched by the navigator, based on the current state of the corresponding process instance. Except for the beginning, the set of formal obstructions of a sphere is in general a proper superset of its actual obstructions (i.e. fobst(S)⊇obst(S)). According to the current teaching, the usual navigation processing of the WFMS is adapted to maintain the set of all actual obstructions.

When the control flow enters such an obstruction, it must wait along the corresponding path until all other obstructions are reached. At this latter point in time, the (root) transaction corresponding to the atomic sphere will be committed by the WFMS.

1.8 Navigation in Atomic Spheres

Let A be an activity implementation that just terminated, so that the WFMS performed a navigation step based on A; in FlowMark™ an "exit condition" must have been met or the activity must have been "forced finished" before a further navigation step of the navigator takes place. For each control connector having a transition condition which evaluates to TRUE returned by the navigator as next possible path to follow, it is checked whether the associated edge is an obstruction to commit or whether the usual processing can be performed (i.e. determination of its target activity, then staff resolution, . . . ). When an obstruction is reached, it is removed from the obstruction set and put into the set of control connectors along which navigation is held. If it was the last obstruction of the sphere S, a commit for the associated transaction is issued. Then all waiting connectors are released, i.e. the usual processing along the corresponding paths continues.

By administrating the set of actual obstruction, the WFMS is able to control when the boundary of an atomic sphere is reached and when to commit all transactional work items which participated in the atomic sphere. FIG. 8 outlines further details of this process. For example, within a loop, an analysis of all outgoing paths from the activity which has finished processing is performed encompassing:

- a step in line 25 to determine the next path within the process model leaving the current activity,
- a step in line 27 to check if the current next path belongs to the set of actual obstructions,
- if the current next path belongs to the set of actual obstructions, a step in line 29,30 to remove that path from the set of formal obstructions and to hold navigation along that path,
- if the current next path does not belong to the set of actual obstructions, a step in line 35 processes the next activity, and
- finally, if the set of actual instructions is empty, the corresponding atomic sphere will be committed in line 41 and all held navigations along connectors is released in line 42.

CONCLUSION

A system and method has been shown in the above embodiments for the effective implementation of a method of ensuring atomicity for a collection of transactional work items in a workflow management system. While various preferred embodiments have been shown and described, it will be understood that there is no intent to limit the invention by such disclosure, but rather, it is intended to cover all modifications and alternate constructions falling within the spirit and scope of the invention as defined in the appended claims.

We claim:

1. A computer-based method of defining and executing at least one atomic-sphere, said atomic sphere comprising a collection of transactional-work items with a common commit scope representing a global transaction, in order to ensure atomicity of a collection of transactional-work items by at least one computer system, said computer system storing a process-model, said process-model comprising one or more activities being represented as nodes of an arbitrary flow graph, and directed edges of said graph being control-connectors defining a potential flow of control between nodes within said process-model and one or more of said activities being transactional-work items which change resources and data of said computer system, said method of defining and executing comprising:

defining said atomic-sphere as a subgraph of said process-model said subgraph containing a subset of said activities and potential flow of control which provides a recoverable consistent state of the process, further determining portions of said potential flow of control of said subgraph which contain at least one activity outside the boundary of said atomic sphere, and wherein during execution said at least one activity outside said boundary of said atomic sphere are processed after the flow of control within said boundary of said atomic-sphere is completed.

2. A computer-based method of defining at least one atomic-sphere as per claim 1, further comprising:

determining sink-activities of said atomic-sphere with no outgoing control-connector, and if at least one sink-activity is determined, adding a no-op-activity to said process-model being outside of said atomic-sphere and connecting said sink-activity to that no-op-activity with a virtual-control-connector, said no-op-activity implementing a dummy activity.

3. A computer-based method of defining at least one atomic-sphere as per claim 2, wherein said control-connectors are associated with transition-conditions said method further comprising adding a TRUE-transition-condition always being true to said virtual-connectors.

4. A computer-based method of defining at least one atomic-sphere as per claim 1, further comprising being executed by a control-instance controlling execution of said process-model.

5. A computer-based method of defining at least one atomic-sphere as per claim 4, wherein said control-instance is one of a workflow-management-system or a transaction-processing-system.

6. A computer-based method of atomically executing an atomic-sphere as per claim 1, further comprising the steps of:

creating an atomic-sphere-transaction-context for said atomic-sphere, if the control-flow along said control-connectors enters said atomic-sphere the first time, and ensuring that the control-flow will not leave said atomic-sphere until the complete control-flow reaches the boundary of said atomic-sphere by postponing navigation along control-connectors leaving said atomic-sphere until all leaving control-connectors are evaluated.

7. A computer-based method of atomically executing an atomic-sphere as per claim 6, further comprising ending said atomic-sphere-transaction-context, when the complete control-flow reaches said boundary of said atomic-sphere by committing all transactional-work items processed as part of said atomic-sphere.

8. A computer-based method of atomically executing an atomic-sphere as per claim 6 further comprising using an existing atomic-sphere-transaction-context, if the control-flow enters an atomic-sphere for which an atomic-sphere-transaction-context has been established already because the control-flow entered said atomic-sphere before.

9. A computer-based method of atomically executing an atomic-sphere as per claim 6, further comprising:

wherein said transactional-work items may either never committing said ending said atomic-sphere-transaction-context of said atomic-sphere, or wherein said transactional-work items may committing said ending of said atomic-sphere-transaction-context of said atomic-sphere only, if no atomic-sphere-transaction-context has been established yet.

10. A computer-based method of atomically executing an atomic-sphere as per claim 6, further comprising one or more of the following steps:
- determining a potential existence of an atomic-sphere-transaction-context by an activity by either calling a query-transaction-service (GetRoot);
- passing said potential existing atomic-sphere-transaction-context to an activity when invoking said activity; or
- passing a transaction-identifier to an activity when invoking said activity said transaction-identifier allowing to determine said atomic-sphere-transaction-context.

11. A computer-based method of atomically executing an atomic-sphere as per claim 10, further encompassing at least one input-container associated with said activity and further comprising the step of passing said atomic-sphere-transaction-context to an activity within said atomic-sphere as part of said input-container.

12. A computer-based method of atomically executing an atomic-sphere as per claim 6, further comprising:
- ensuring that the control-flow will not leave said atomic-sphere (S) until the complete control-flow reaches the boundary of said atomic-sphere by administrating a set of actual-obstructions (OBST(S)) comprising the set of all control-connectors originating from activities within said atomic-sphere directed to target-activities outside said atomic-sphere and which control-connectors have not been reached so far by the current process instance; and
- delaying execution of said target-activities until all obstructions of said set of actual-obstructions have been reached.

13. A computer-based method of atomically executing an atomic-sphere as per claim 6, further comprising being executed by a control-instance controlling execution of said process-model.

14. A computer-based method of atomically executing an atomic-sphere as per claim 13, wherein said control-instance is one of a work-flow-management-system or wherein said control-instance is a transaction-processing-system.

15. An article of manufacture comprising a computer user medium having computer readable program code embodied therein for defining and executing at least one atomic-sphere, said atomic sphere comprising a collection of transactional-work items with a common commit scope representing a global transaction, in order to ensure atomicity of a collection of transactional-work items by at least one computer system, said computer system storing a process-model, said process-model comprising one or more activities being represented as nodes of an arbitrary flow graph, and directed edges of said graph being control-connectors defining a potential flow of control between nodes within said process-model and one or more of said activities being transactional-work items which change resources and data of said computer system, said method of defining and executing comprising:
- defining said atomic-sphere as a subgraph of said process-model said subgraph containing a subset of said activities and potential flow of control which provides a recoverable consistent state of the process,
- further determining portions of said potential flow of control of said subgraph which contain at least one activity outside boundary of said atomic sphere, and
- wherein during execution said at least one activity outside said boundary of said atomic sphere are processed after the flow of control within said boundary of said atomic-sphere is completed.

16. An article of manufacture comprising a computer user medium having computer readable program code embodied therein defining at least one atomic-sphere as per claim 15, further comprising:
- determining sink-activities of said atomic-sphere with no outgoing control-connector, and if at least one sink-activity is determined, adding a no-op-activity to said process-model being outside of said atomic-sphere and connecting said sink-activity to that no-op-activity with a virtual-control-connector, said no-op-activity implementing a dummy activity.

17. A computer program product defining and executing at least one atomic-sphere, said atomic sphere comprising a collection of transactional-work items with a common commit scope representing a global transaction, in order to ensure atomicity of a collection of transactional-work items by at least one computer system, said computer system storing a process-model, said process-model comprising one or more activities being represented as nodes of an arbitrary flow graph, and directed edges of said graph being control-connectors defining a potential flow of control between nodes within said process-model and one or more of said activities being transactional-work items which change resources and data of said computer system, said method of defining and executing comprising:
- defining said atomic-sphere as a subgraph of said process-model said subgraph containing a subset of said activities and potential flow of control which provides a recoverable consistent state of the process,
- further determining portions of said potential flow of control of said subgraph which contain at least one activity outside said boundary of said atomic sphere, and
- wherein during execution said at least one activity outside the boundary of said atomic sphere are processed after the flow of control within said boundary of said atomic-sphere is completed.

18. A computer program product defining at least one atomic-sphere as per claim 17, further comprising:
- determining sink-activities of said atomic-sphere with no outgoing control-connector, and
- if at least one sink-activity is determined, adding a no-op-activity to said process-model being outside of said atomic-sphere and connecting said sink-activity to that no-op-activity with a virtual-control-connector, said no-op-activity implementing a dummy activity.

* * * * *

UNITED STATES PATENT AND TRADEMARK OFFICE
CERTIFICATE OF CORRECTION

PATENT NO. : 6,009,405
DATED : December 28, 1999
INVENTOR(S) : Leymann et al.

It is certified that error appears in the above-identified patent and that said Letters Patent is hereby corrected as shown below:

Title page,
Foreign Application Priority Data, change "96112430" to -- 96112430.2 --.

ABSTRACT,
First sentence change "systems" to -- systems --.
Second sentence after "collection of" delete -- a --.

Column 1,
Line 12, change "systems" to -- system --.

Column 2,
Line 33, change "transaction" to -- transactions --.

Column 3,
Line 45, after "influence on" insert therefore -- a --.

Column 4,
Line 55, delete "run time" insert therefore -- runtime --.

Column 6,
Line 28, after "objects" insert therefore -- that --.
Line 34, delete "manufactures" insert therefore -- manufacturers --.
Line 40, after "users" insert therfore -- of --.
Line 45, delete "WFMS" insert therefore -- WFMSs --.

Column 8,
Line 48, delete "WFMS" insert therefore -- WFMSs --.
Line 51, after "type" insert therefore -- of --.

Column 10,
Line 35, delete "in" insert therefore -- the --.

Column 12,
Line 1, delete "(run time)" insert therefore -- (runtime) --.
Line 19, delete "run time" insert therefore -- runtime --.
Line 28, delete "model" insert therefore -- models --.
Line 36, delete "run time" insert therefore -- runtime --.
Line 39, after "connectors" insert therefore -- , --.
Line 40, after "TRUE" insert therefore -- , --.
Line 43, delete "model" insert therefore -- models --.

UNITED STATES PATENT AND TRADEMARK OFFICE
CERTIFICATE OF CORRECTION

PATENT NO. : 6,009,405
DATED : December 28, 1999
INVENTOR(S) : Leymann et al.

It is certified that error appears in the above-identified patent and that said Letters Patent is hereby corrected as shown below:

Column 12 cont'd,
Line 43, after "thus" insert therefore -- have --.
Line 57, delete "container," insert therefore -- containers, --.

Column 13,
Line 3, after "are" insert therefore -- , --.
Line 14, delete "modeler" insert therefore -- modelers --.
Line 21, delete "situation" insert therefore -- situations --.
Line 46, delete "of" insert therefore -- or --.

Column 14,
Line 43, after "Therefore" insert therefore -- , --
Line 52, after "of" insert therefore -- the --.
Line 54, after "considered" delete -- to be --.

Column 15,
Line 32, after "objects" insert therefore -- that --.
Line 38, delete "manufactures" insert therefore -- manufacturers --.

Column 16,
Line 23, after "item" insert therefore -- , --.
Line 38, after "therefore" insert therefore -- , --.

Column 17,
Line 52, delete "S={A,...,M}" insert therefore -- S={A,...,H} --.

Column 18,
Line 7, delete "passed" insert therefore -- pass --.
Line 37, after "called" insert therefore -- a --.
Line 60, delete fobst(S)°obst(S)) insert therefore -- fobst(S) $\supseteq$ obst(S)) --.

Column 19,
Line 8, after "as" insert therefore -- the --.
Line 31, delete "29,30" insert therefore -- 29, 30 --.
Line 39, delete "is" insert therefore -- are --.

UNITED STATES PATENT AND TRADEMARK OFFICE
CERTIFICATE OF CORRECTION

PATENT NO. : 6,009,405
DATED : December 28, 1999
INVENTOR(S) : Leymann et al.

It is certified that error appears in the above-identified patent and that said Letters Patent is hereby corrected as shown below:

Colum 20,
Line 2, after "model" insert therefore -- , --.

Column 22,
Line 44, after "execution" insert therefore -- of --.

Signed and Sealed this

Twenty-second Day of January, 2002

Attest:

*Attesting Officer*

JAMES E. ROGAN
*Director of the United States Patent and Trademark Office*